United States Patent [19]
Riera et al.

[11] Patent Number: 4,672,866
[45] Date of Patent: Jun. 16, 1987

[54] AUTOMATIC FASTENER SYSTEM WITH FASTENER DETECTION MEANS

[76] Inventors: Frank J. Riera, 576 Colebrook, Troy, Mich. 48083; Brent A. Thorn, 15401 Hubbard Ave., Livonia, Mich. 48154

[21] Appl. No.: 742,061

[22] Filed: Jun. 6, 1985

[51] Int. Cl.⁴ .............................................. B25B 23/06
[52] U.S. Cl. ...................................... 81/57.37; 81/430
[58] Field of Search ...................... 81/57.37, 430, 431, 81/432, 433, 434, 435

[56] References Cited

U.S. PATENT DOCUMENTS

| | | | |
|---|---|---|---|
| 2,989,996 | 6/1961 | Dixon | 81/57.37 |
| 3,583,451 | 6/1971 | Dixon et al. | 81/430 X |
| 4,442,738 | 4/1984 | Spencer | 81/57.37 |

FOREIGN PATENT DOCUMENTS

| | | | |
|---|---|---|---|
| 1503093 | 10/1969 | Fed. Rep. of Germany | 81/57.37 |
| 2236951 | 2/1974 | Fed. Rep. of Germany | 81/57.37 |
| 1115894 | 9/1984 | U.S.S.R. | 81/57.37 |

*Primary Examiner*—Frederick R. Schmidt
*Assistant Examiner*—Debra S. Meislin
*Attorney, Agent, or Firm*—Gifford, Groh, VanOphem, Sheridan, Sprinkle & Dolgorukov

[57] ABSTRACT

There is disclosed an automatic fastener driving system suitable for robotic applications utilizing a modified fastener driver having a unique detection mechanism in the head of the driver working in combination with a pneumatically operated advance and retract mechanism, and control circuitry, to detect when a fastener is present in the driver, to advance and drive the fastener into the workpiece, and to then automatically retract therefrom.

28 Claims, 17 Drawing Figures

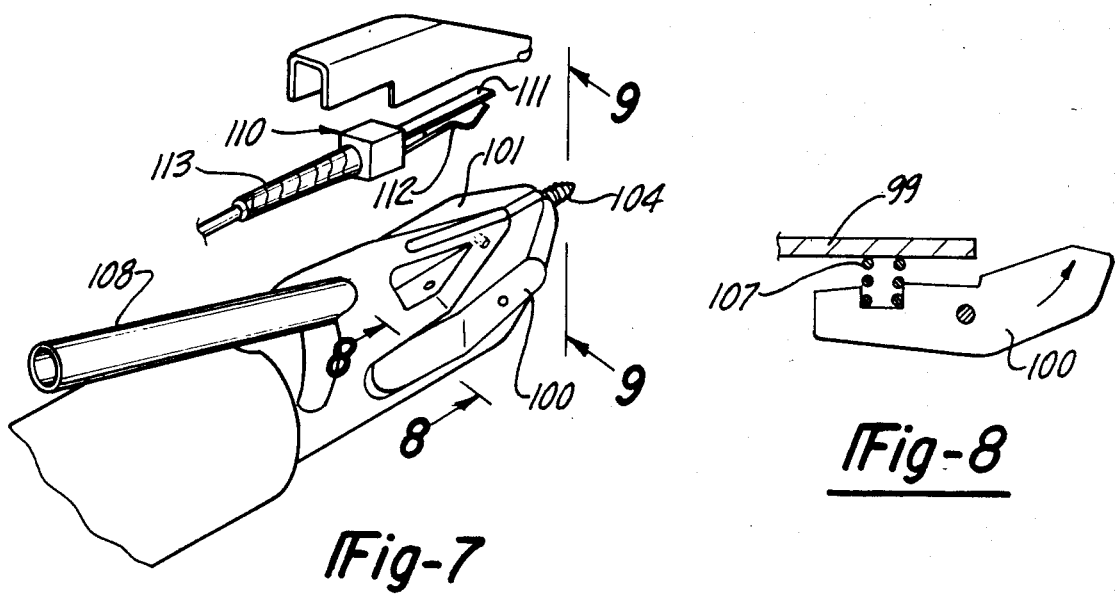
Fig-7
Fig-8
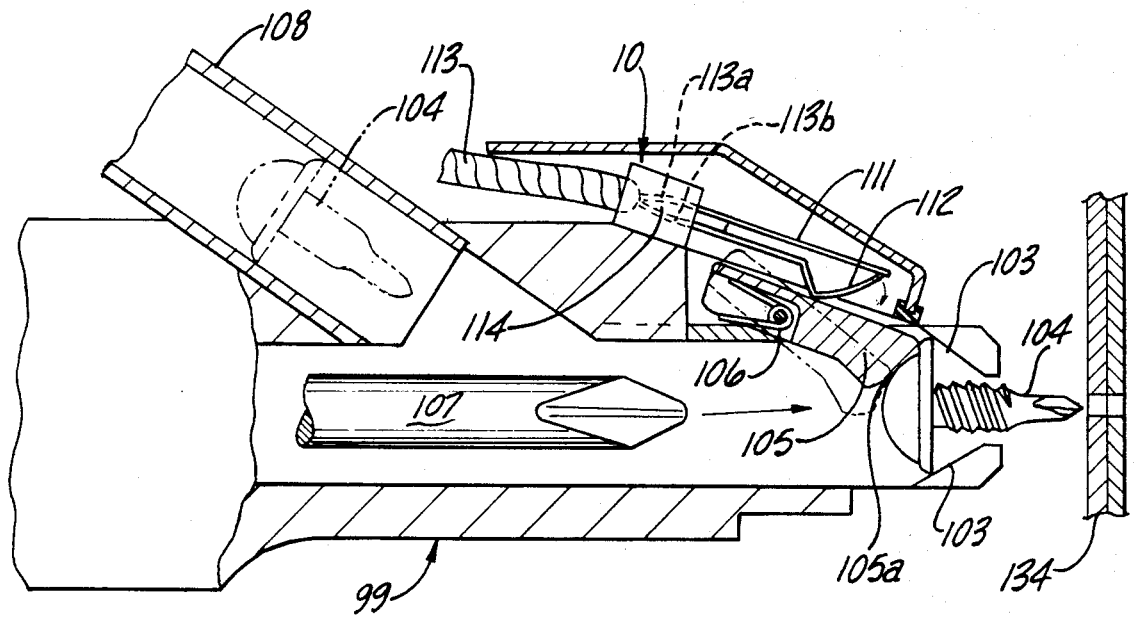
Fig-9

AUTOMATIC FASTENER SYSTEM WITH FASTENER DETECTION MEANS

BACKGROUND OF THE INVENTION

1. Field of Invention

The present invention relates to automatic fastener systems of the type which automatically feed, and then drive, a screw or similar fastening means into a workpiece, and more particularly to an automatic screwdriver system of this type which has screw detection means to indicate when a screw is present in the screwdriver head, as well as automatic advance and retract means, and is particularly adapted, therefore, to be mounted and used in robotic manufacturing systems.

The improvements over the prior art disclosed in the present application relate to a particular screw sensing means to detect when a screw is present in the system so the automatic advance and retract means will know when it may operate without seriously damaging the screwdriver system. The automatic advance and retract means operates by use of proximity switches, and this, in connection with a signal received when a part is present, can be utilized by relay logic, or a programmable controller, to operate the system.

2. Description of the Prior Art

Automatic screw feeders used by the worker on the production line have been known in the art for some time. One such automatic screw feeder is sold under the name "Acra-Feed", and is manufactured by the AIM Corporation of Portland, Oreg. The purpose of these units is to feed a screw pneumatically to a screwdriver head, which then electrically or pneumatically drives the screw with operator assistance; thus, relieving the worker of the tedious task of constantly having to pick up and locate a new screw each time one is to be inserted in a part. However, it can be seen that these units still require the presence of the worker to hold the screwdriver head in proximity to the work, determine when a screw has been fed into the screwdriver head, and then hold the unit when the screw is driven. Thus, while these devices are called automatic screw feeders, they certainly cannot be called "automatic screwdrivers".

Many attempts have been made to eliminate the need for the operator to actually drive screws, or other fasteners, as a means of connecting parts together on the production line. However, until the present invention, there have been many problems which have remained unsolved in the art. Two of the most serious problems were how to accurately advance and retract the driving head automatically, and, perhaps more importantly, how to detect, in the absence of the worker being present, when a screw, or other fastener, was present in the driving head to prevent destruction of the apparatus should it try to advance into the workpiece without a screw present. Thus, the dual problems of screw detection and driver movement have remained unsolved in the prior art up until the present time.

SUMMARY OF THE INVENTION

In order to solve the problems of automatic advance and retract, and screw detection, a driver head is modified, and a unique pivoting member is installed, to provide a fastener detecting means which is capable of providing a signal when a screw, or other fastener, is present. In addition, a novel slide system is provided to advance and retract the driver head, and both of these are operated by suitable control means such as an automatic relay system, or a programmable controller, to provide an automatic screwdriver system capable of being used in robotic fastener applications.

Thus, it is an object of the present invention to provide an automatic screwdriver system capable of loading and driving a screw into a hole in a part, and which is capable of supplying a signal when a screw is present in the system.

A further object of the present invention is to provide an improved automatic screwdriver having means to advance and retract said screwdriver toward and away from a workpiece without the need for a worker being present.

A further object of the present invention is to make an electric automatic screwdriver system which is light in weight.

A further object of the present invention is to provide an automatic screwdriver system which is adaptable to robotic fastener applications.

A further object of the present invention is to provide an automatic screwdriver system which will advance and install a screw into a part upon receiving an outside signal from an industrial system that a part is present.

A still further object of the present invention is to provide a cost effective automatic screwdriver system.

A still further object of the present invention is to provide a programmable automatic screwdriver system.

A further object of the present invention is to provide an automatic screwdriver system adaptable for robotic fastener applications which is relatively inexpensive to manufacture, and reliable and repeatable in operation.

Further objects and advantages of the present invention will be apparent from the following description and appended claims, reference being made to the accompanying drawings forming a part of this application, wherein like reference characters designate corresponding parts in the several views.

BRIEF DESCRIPTION OF THE DRAWINGS

FIG. 7 is an exploded view, partially cutaway, showing the driver portion of our improved construction.

FIG. 8 is a sectional view, taken in the direction of the arrows, along the section line 8—8 of FIG. 7.

FIG. 9 is a sectional view, taken in the direction of the arrows, along the section line 9—9 of FIG. 7, with the parts assembled.

FIG. 17 is a diagrammatic view illustrating the computer program utilized in the programmable controller illustrated in FIG. 14.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
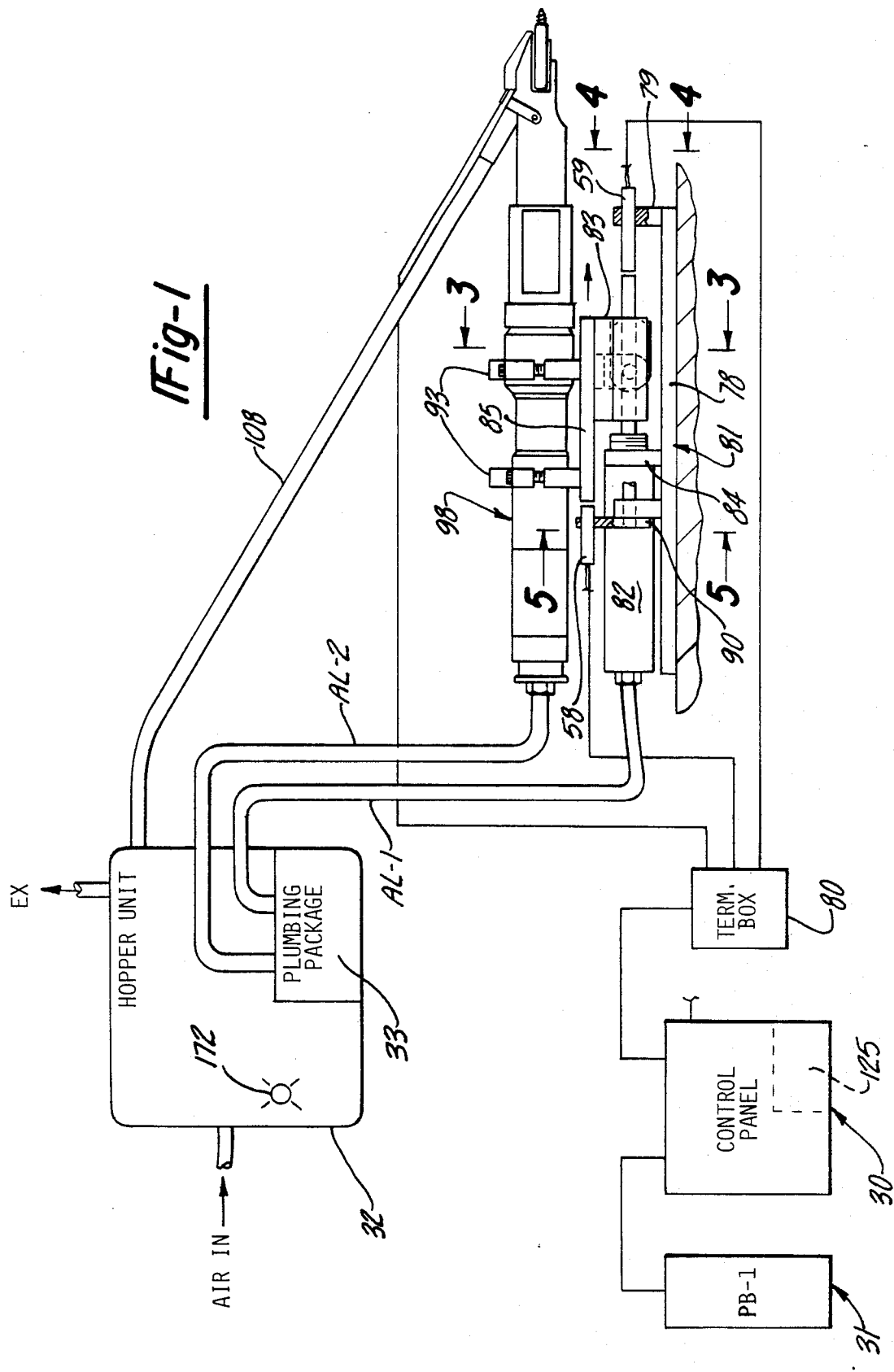
FIG. 1 is a diagrammatic view, partly in section, of a construction embodying the present invention.
Figure 2:
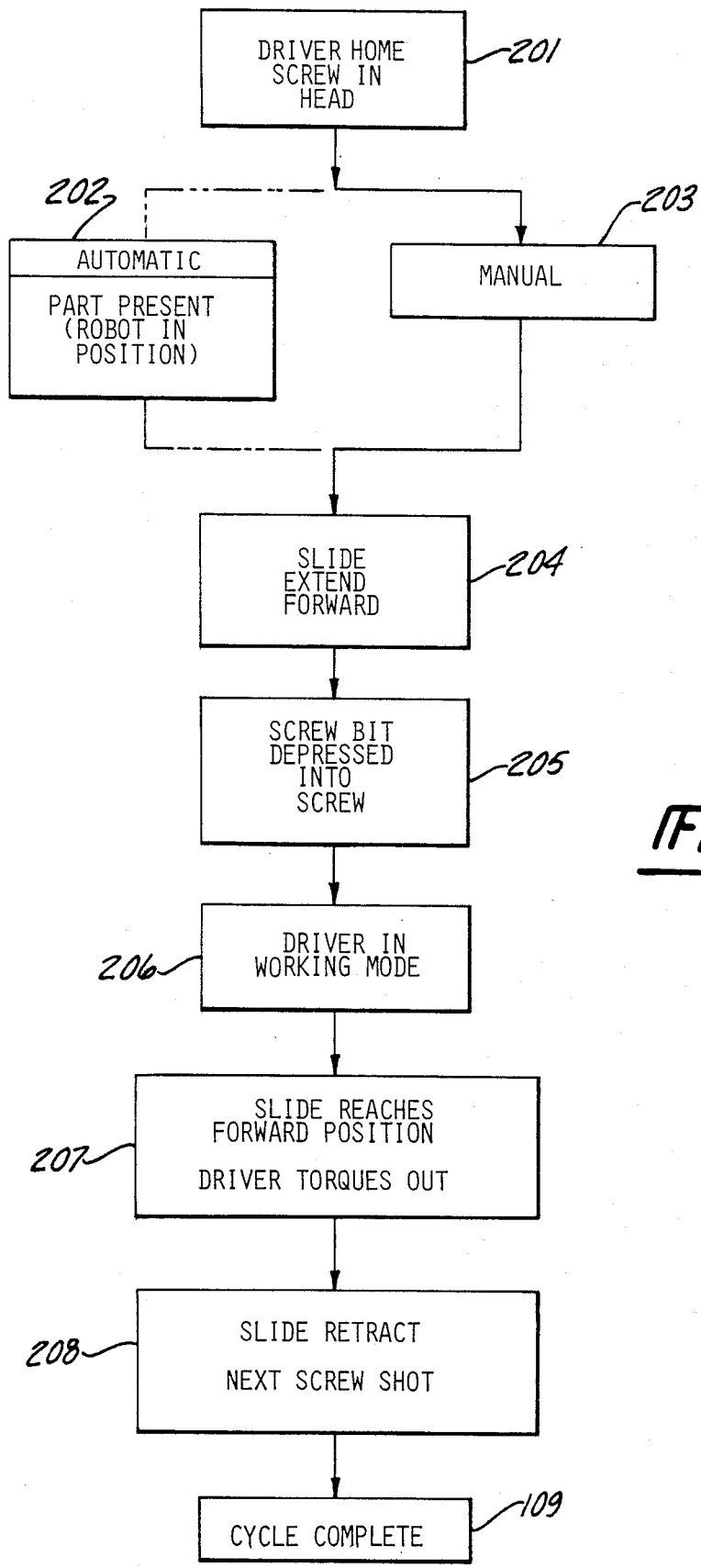
FIG. 2 is a flow chart showing the sequence of steps followed in the operation of our system.
Figure 3:
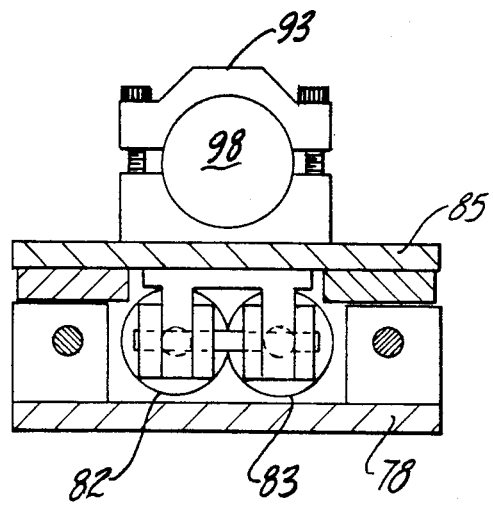
FIG. 3 is a sectional view, taken in the direction of the arrows, along the section line 3—3 of FIG. 1.
Figure 4:
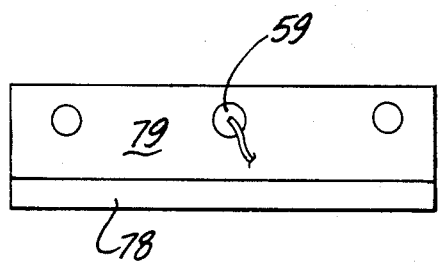
FIG. 4 is a sectional view, taken in the direction of the arrows, along the section line 4—4 of FIG. 1.
Figure 5:
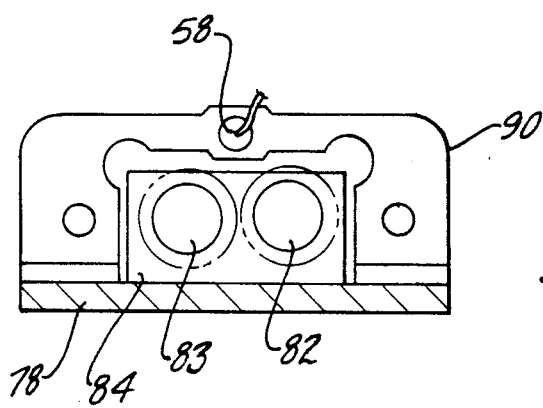
FIG. 5 is a sectional view, taken in the direction of the arrows, along the section line 5—5 of FIG. 1.
Figure 6:
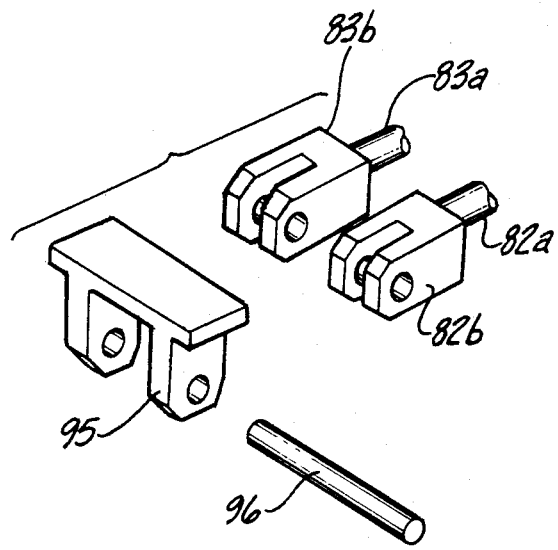
FIG. 6 is an exploded view of a clevis linkage used in the present invention.

Referring now to FIGS. 1 and 2, there is shown a diagrammatic view of our construction, as well as a flow chart showing the cycle of operations performed thereby, for both the relay and programmable controller versions. Generally, all automatic screwdriver systems consist of a control panel, generally designated by the numeral 30, to which switches, such as the emergency stop pushbutton, the power "on" pushbutton, and the power "off" pushbutton to be described later may be mounted. The control panel is connected by a suitable cable to pushbutton box 31 to which the switches used in the setup of the system are usually mounted, such as the slide extend and slide return pushbuttons, and the auto/manual mode select switch.

The control panel, in turn, is connected by a further cable to a hopper unit 32 which holds the screws to be used in the system. The hopper unit is connected by means of various pneumatic conduits to feed a screw to the driver unit, to supply air pressure for the operation of the screwdriver, and the cylinders which extend and retract the slide unit. A terminal box 80 is connected by a suitable cable to the control panel 30 and, in turn, by suitable electrical conduits to the various parts of the system.

The first step in the operation of our improved system, regardless of version, requires that the screwdriver be in its home, or retracted, position, and that a screw is in the screwdriver head, ready to be driven (Box 201).

The next step is for the system to determine that a part is present. In the controller version (Box 202), a signal must be supplied from an external limit switch, such as from in another area of a robotic system, to enable the system to receive a start signal to start the succeeding sequences of operation.

In the relay logic system (Box 203), the operator will be the one determining that a part is present, and that a screw is present in the screwdriver head, and then he will push the appropriate pushbutton to start the rest of the series of steps.

After the part present signal is received, or the pushbutton is depressed, the slide will then start extending forward by air entering the air cylinders. This operation will continue until the screwdriver bit is depressed into the screw (Box 204). When this happens, the screwdriver bit is energized by an internal pilot in the driver and starts to rotate (Box 205). When this occurs, it is referred to in the art as "running down the screw" (Box 206). This step in the operation will take a varying length of time depending on the length and the size of the screw. The longer the screw, or the larger the screw size, the longer this portion of the sequence will take.

When the screw is completely run down into the part to the preselected, desired torque, by virtue of a proximity switch and the torque clutch inside the driver mechanism, the system can tell that the slide has reached its forward position, and the slide stops advancing (Box 207). When the screw is completely seated, the screwdriver motor torques out and stalls, and when this situation occurs, the system is enabled to start the slide retracting (Box 208) by reversing the air supply entering the cylinders, causing the slide to be retracted, until another proximity switch is activated, telling the system the slide is fully retracted, at which point a limit switch is activated to tell the feed mechanism to shoot another screw into the screwdriver head, thus returning the sequence of operations to Box 201.

Figure 10:
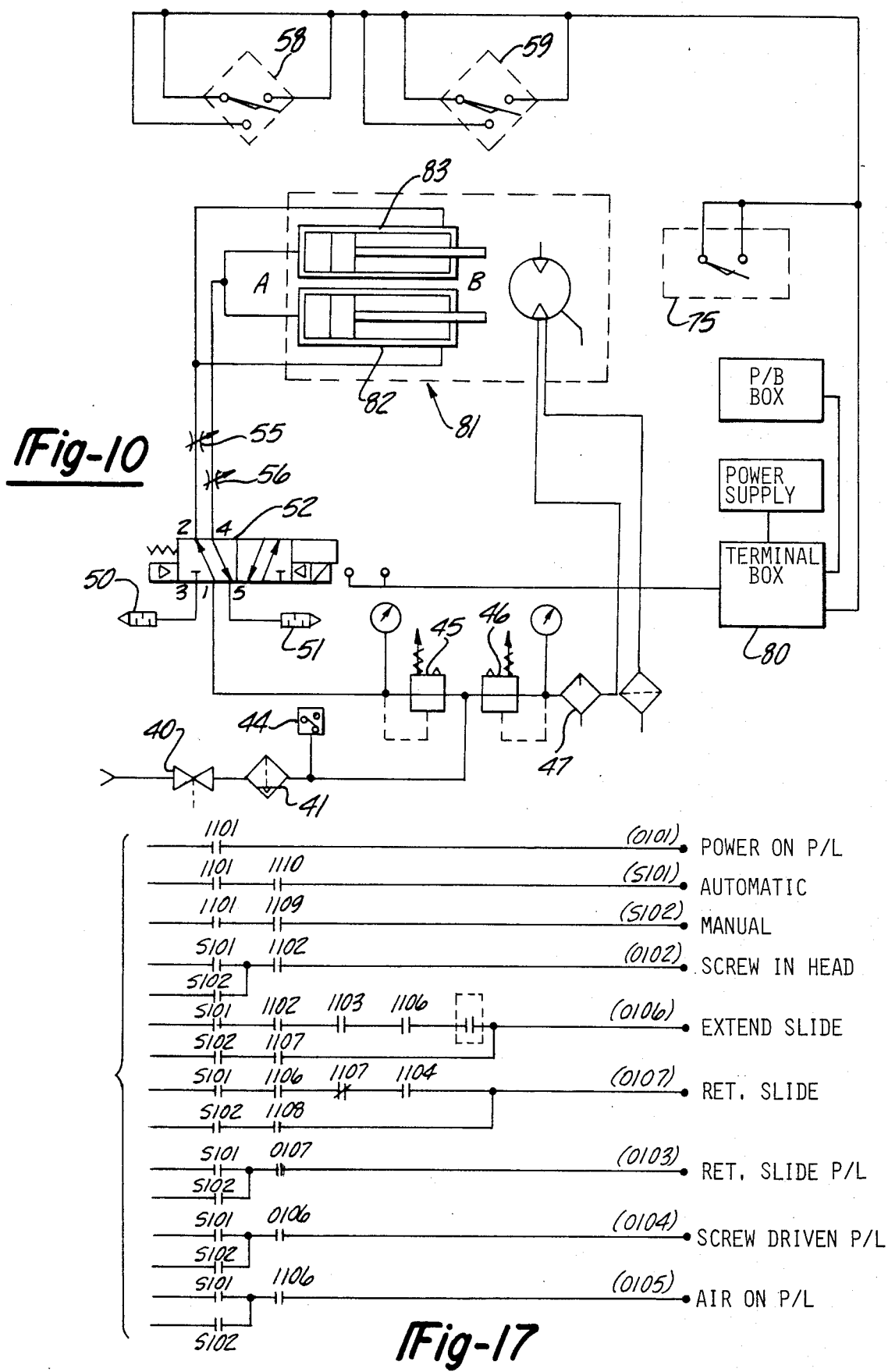
FIG. 10 is a schematic view of the pneumatic portion of our construction.

Referring to FIG. 10, it can be seen how this is accomplished. Air is supplied from a source (not shown) through a suitable conduit to a shut-off valve 40, which may be such as the Model No. LM-37 manufactured by I.S.I. of Fraser, Mich., or the like. A conduit connects the shut-off valve 40 to an air filter 41, such as the CBG-03-F00 ¼" air filter manufactured by Nu-Air Products of Farmington, Mich., which ensures that the air reaching the rest of system is free from contaminants.

Figure 11:
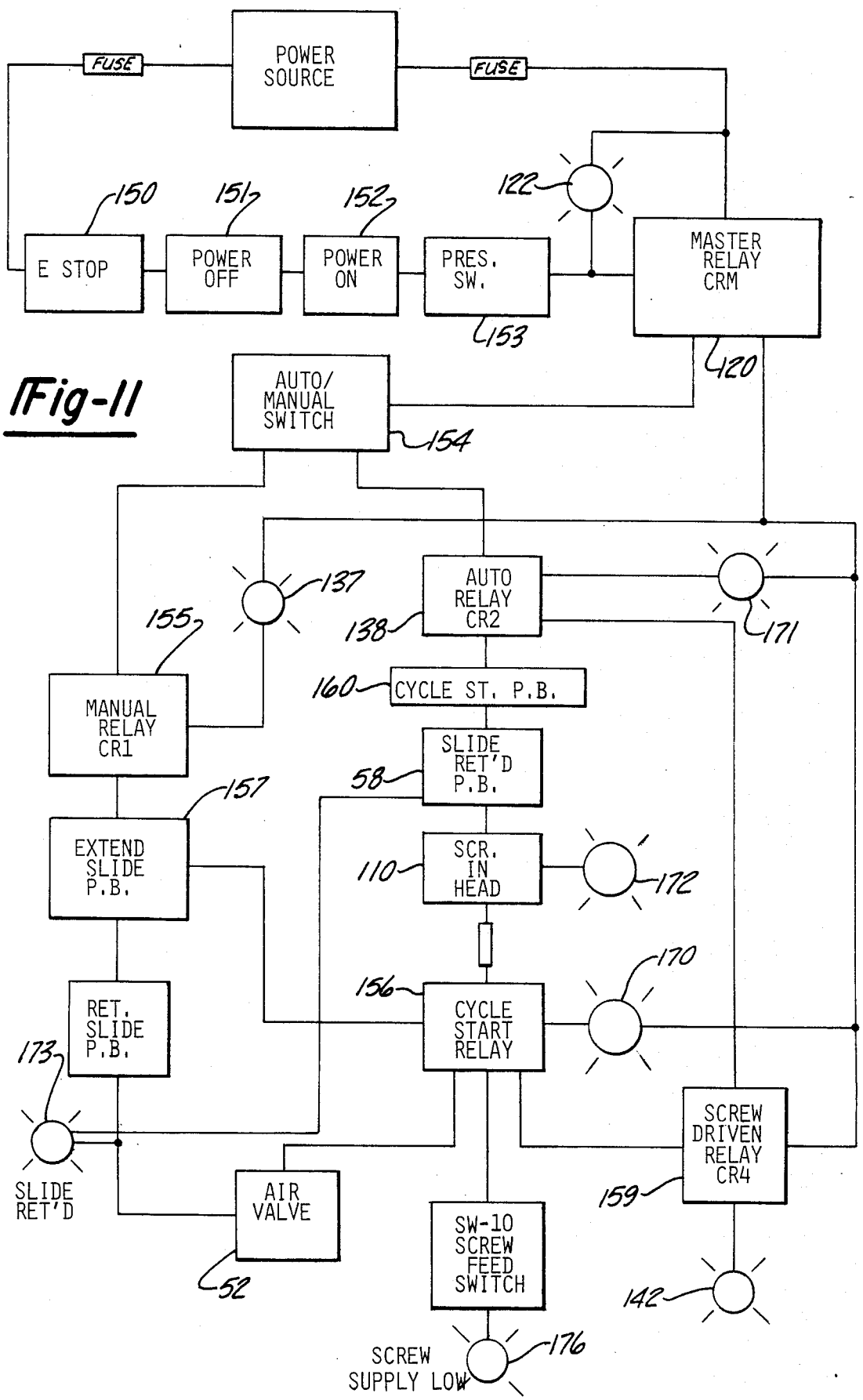
FIG. 11 is a block diagram of our automatically operated system using relay logic.

Since many of the components of our system operate pneumatically, such as the air cylinders 82 and 83 operating the driver unit 98, the screwdriver 107, and the hopper unit which supplies screws to the driver unit 98 through the feed tube 108, a constant air supply at sufficient pressure is important. It has been found by experimentation that our system will not operate properly unless the air is supplied at a pressure of approximately 60 to 80 p.s.i., while the air pressure may go over 80 p.s.i., less than 60 p.s.i. causes the system to operate erratically. Thus, connected to the air filter is a pressure switch 44, which may be such as the Model No. 836T-T253J manufactured by Allen-Bradley of Milwaukee, Wis. If the pressure switch 44 finds that the system air pressure has fallen below sixty p.s.i., it will cut power to the system as seen in FIG. 11, and will not permit further operation to continue until proper air pressure is supplied.

The pneumatic circuit branches after the air pressure switch 44. A first air regulator 45 and a second air regulator 46, which both may be such as the Model No. 06R213AA manufactured by Parker-Hannifin of Otsego, Mich., or the like, are connected by suitable conduit to the air source through the shut-off valve 40, the air filter 41, and the pressure switch 44. One conduit branch, after passing through the second air regulator 46, is connected to a lubricator 47, such as Model No. RL554-1,2 manufactured by Master Pneumatic of Detroit, Mich., or the like, which supplies lubricated air to the driver unit 81. It should be understood, however, that a prelubricated unit could be used, if desired.

The other branch of the pneumatic circuit is connected by a suitable conduit to a single solenoid two-way air valve 52. To port one is connected the first air regulator 45, while to ports three and five are connected a first air silencer 50, and a second air silencer 51.

Connected to port two of the two-way air valve 52 is a first in-line flow control 55 which is connected to the "A" side of the automatic slide unit 81 to be described in greater detail hereinafter. Connected to port four of the air valve 52 is a second in-line flow control 56 connected to the "B" side of the automatic slide unit. Both of the flow controls may be such as the Model No. FS-14 manufactured by I.S.I. of Fraser, Mich., or the like.

Figure 13:
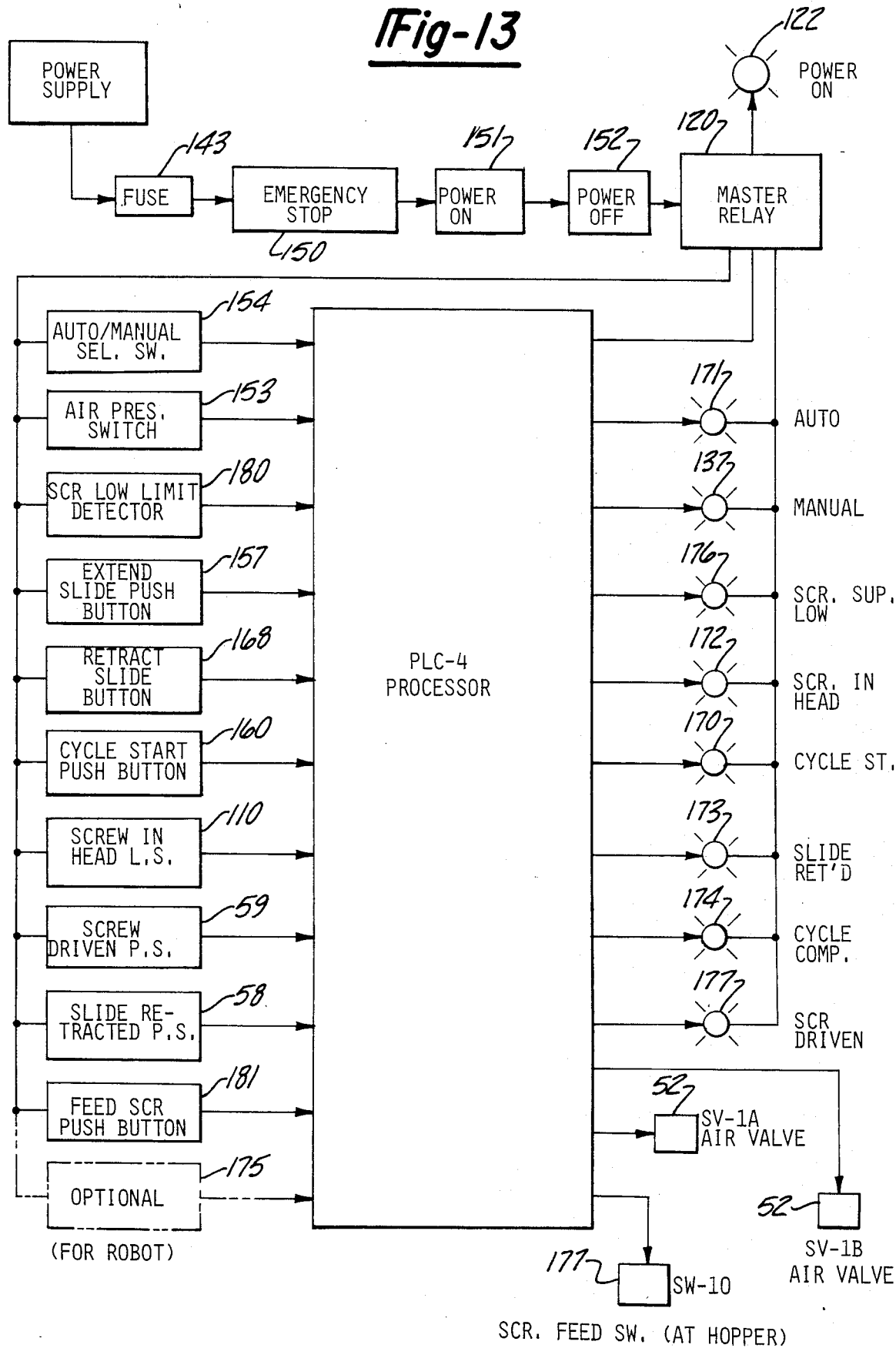
FIG. 13 is a block diagram of our automatically operated construction using a programmable controller.

There is provided in the system a terminal box 80 containing the circuitry shown in FIG. 11 for the relay operated system, or for the programmable controller system shown in FIG. 13. Connected to the terminal box 80 is the solenoid (SV-1) which operates the two-way air valve 52, as well as a slide home proximity switch 58, and a screw driven proximity switch 59. Both of these switches may be such as those manufactured by Micro-Switch of Detroit, Mich.

Referring to FIGS. 1 and 4-9, our novel slide unit is illustrated in greater detail. The slide unit, generally designated by the numeral 81, includes a base 78 to which is fixedly mounted cylinder mounting bracket 84, to which a first air cylinder 82 and a second air cylinder 83, which may be identical, are mounted by means well known in the art. A single air cylinder may be used with very small fasteners, if desired, but we prefer using two cylinders, as this gives the system the flexibility to meet most applications.

Mounted to the base 78 is a proximity switch mounting bracket 90, to which the slide home limit switch 58 previously described is mounted. At the opposite end of the base 78 is mounted the screw driver proximity switch 59 by means of switch bracket 79. A plurality of mounting slots (not shown) are provided in the base 78 for mounting our slide unit to the robotic equipment manufactured by others. The various parts of the slide unit 81 can be made of many suitable materials, such as steel, aluminum, etc. However, we prefer to use aluminum because of the weight saving opportunities it provides.

The driver unit, generally designated by the numeral 98, is mounted by way of a pair of driver clamps 93 to the drive bracket 85. To drive the drive bracket 85 in a reciprocating fashion, and thus also drive the driver unit 98 in a similar fashion, a connection must be made between the shafts 82A and 83A of the first air cylinder and the second air cylinder respectively, and the drive bracket 85. This is accomplished by mounting a first clevis bracket 82b on the end of the shaft 82a of the first air cylinder 82, and a second clevis bracket 83b on the end of the shaft 83a of the second air cylinder 83. The mounting of the brackets is accomplished by any of several means well known in the art.

The first clevis bracket and the second clevis bracket are pivotally mounted to the clevis 95 mounted on the drive bracket 85 by the clevis pin 96. It can easily be seen that when the shafts are extended, forces are applied to the first and second clevis, 82B and 83B respectively, and through the clevis pin 96 to the clevis 95 mounted to the drive bracket 85, to provide a reciprocating motion to the bracket and thus to the driver unit 98. This motion, for reasons which will be more fully described later, occurs between the limits established by the slide home proximity switch 58, and the screw driven proximity switch 59; thus, providing a novel slide unit for an automatic screwdriver not heretofore available in the art.

Referring now to FIGS. 7-9, our novel driver unit, which is for the first time able to provide a detection signal when a screw, or other fastener, is present therein, is illustrated in greater detail. Generally, there is provided at the forward end of the driver unit, generally designated by the numeral 98, a hollow head portion, generally designated by the numeral 99, having a pair of laterally movable jaws pivotally mounted therein. For ease of understanding, these may be referred to as as right-hand jaw 100 and a left-hand jaw 101.

The jaws 100 and 101 are generally biased in a closed position by a pair of identical jaw springs 102 interposed between the jaws and suitable portions of the hollow head portion 99. The jaw springs used in our construction are heavier than those found in commercially available driver units without screw detection means for purposes which will be explained in more detail later. Acting in cooperation, the jaws 100 and 101, and the interiorly tapered nose portions 103 of the jaws will act to retain the screw 104 in position to be driven.

Also, assisting in maintaining the screw in place is the pivoting member 105 biased in a normally downward position by the action of the leaf spring 106 interposed between the pivoting member 105 and a suitable portion of the hollow head unit 99. As can be seen by referring to FIG. 9, a screw 104 is shown in position to be driven by the powered screwdriver bit 107 which receives screws 104 through the feeder tube 108 attached to the feed mechanism 109 contained within the hopper unit 32, which may be one of many standard feed units on the market, such as the Acra-Feed unit manufactured by AIM Corporation, as previously mentioned. However, for an automatic screwdriver to be used in a robotic system, it is essential that the system receive an indication of when a screw is present to be driven. Failure to receive this signal will result in the destruction of the workpiece or of the driver unit when the screwdriver bit 107 attempts to drive a screw 104 which is not there.

In order to provide this signal, our novel pivoting member 105, not present in other constructions, is combined with a screw present switch, generally designated by the numeral 110, which consists of an upper contact 111, a lower contact 112, a suitable connecting cable 113 having conductors 113A and 113B, and an insulating block 114.

The shaping and installation of the pivoting member 105, and the choosing of the tension of the jaw springs 102 and leaf spring(s) 106 is particularly important to the correct operation of our invention. Many problems were encountered in designing our system and in modifying present day screw feeding units to properly be able to send a screw detection signal.

We first tried to attach our screw present switch assembly 110 above the old screw stop normally found in the screw feeding units. However, this was completely unsatisfactory, as the screw stop was too short, and while it contacted the screw head when the screw 104 was in place, it was not consistent as to what position it would be in and it, therefore, would not properly operate the switch assembly 110. Furthermore, the spring found in the old unit was so weak that the air blast from the screw feed unit alone would move the screw stop, whether or not a screw was in place.

Our first attempt at a solution to this problem was to eliminate the old screw stop and replace it with our novel pivoting member 105 having its forward portion 105A complementary in shape to the head of the screw 104. This proved to provide reliable positioning for the pivoting member 105 when the screw was in position. However, because it was longer, and to prevent the air blast from causing a false signal, we had to modify the means of mounting our pivoting member 105 by cutting back the hollow head portion 99 of the driver unit 98, and installing a stronger leaf spring 106 so that, unless a screw 104 was present to force it upward to move lower contact 112 into physical contact with upper contact 111, the pivoting member 105 would be forced into a downward position by the stronger leaf spring to avoid air blast problems. The leaf spring used in our construction now has a spring constant in the range of 24 in. lbs., instead of one in the range of 6 in. lbs., which the old construction had. We have found this range to be satisfactory for a wide range of fastener applications, but contemplate that it may have to modified by experimentation for either very large or very small screws.

With the leaf spring 106, and thus pivoting member 105, providing greater pressure on the head of the screw 104 when it was in position, stronger jaw springs 102 also had to be used so that the pressure of the pivoting member 105 on the screw head would not push it out of the jaws 100 and 102. We have found that a jaw spring constant in the range of 30 in. lbs. to 35 in. lbs. is satisfactory for most purposes. Again, depending upon the particular fastener application, this may have to be modified. As can be seen, when there is no screw 104 present inside the hollow head unit 99, the screwdriver bit 107 is retracted, and the pivoting member 105 assumes the position shown in phantom lines by virtue of the operation of the leaf spring 106.

When the pivoting member 105 is in such a position, the lower contact 112 of the screw present switch 110 is out of contact with the upper contact 111; thus, not closing the circuit between conductors 113A and 113B attached to the contacts 111 and 112 respectively inside the insulating block 114. However, when the feed mechanism shoots a screw 104 through the feed tube 108 into the hollow head unit 99, the screw will temporarily force the pivoting member 105 into its upward most position to allow the screw 104 to pass thereunder, and come up against the interiorly tapered portions 103 of the jaws 100 and 101.

The pivoting member 105 will then move down somewhat, lodging against the head of the screw 104, and the combination of the pivoting member 105, and the interior sloped portions 103 of the right-hand and left-hand jaws 100 and 101 respectively will maintain the screw in position. In addition, because the pivoting member 105 is now in a partly upward position, this, in turn, will force the lower contact 112 into contact with the upper contact 111, thus completing the necessary circuit through the conductors 113A and 113B, and a screw present signal will be sent to the rest of the system.

Having now explained the mechanical operation of the various parts of our improved construction, attention is now directed to FIG. 2 which, when taken in combination with FIGS. 11-14, will show the electrical connections necessary to make our system work.

It can be understood that any practicable voltage conversion can be made, depending upon the particular application to which our system is to be put. The system has been illustrated in some figures for operation on 480-volt AC because this is a typical current available in a factory environment.

Referring to FIG. 2, for the cycle to begin in our automatic screwdriver, the driver must be home and there must be a screw in the head. For the driver to be home, the first air cylinder 82 and the second air cylinder 83 must be in their retracted position. For this to occur, the two-way air valve 52 must have its "B" side activated and this occurs when the slide home proximity switch 58 is activated.

While our system is completely automatic, we have illustrated it in two versions, one using relay logic which is less expensive to manufacture, and the other version using a programmable controller, which is preferred.

Figure 12:
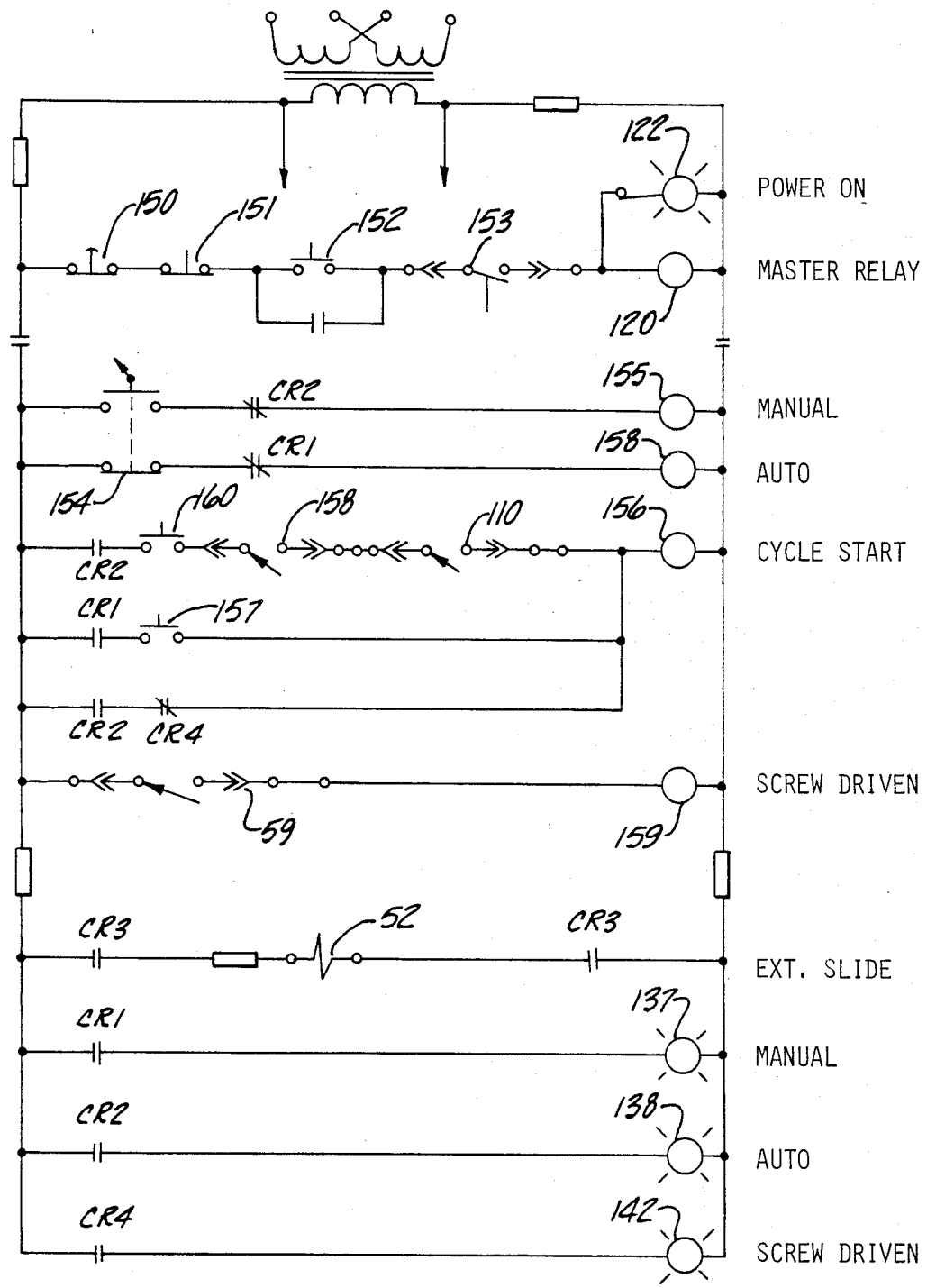
FIG. 12 is a ladder diagram of an embodiment of our automatically operated system using relay logic.

Referring now to FIGS. 2, 11, and 12, the operation of our system using relay logic will first be described. Preliminary to the operation of the system, the operator will determine that none of the emergency stop pushbuttons 150, which may be provided at each location where one of our automatic screwdrivers is provided, has been depressed, as the depression of emergency stop pushbutton 150 will cut power to the system.

The operator will then depress the normally open power "on" pushbutton 151, and providing that the air pressure switch 153 is in a position to indicate that air at the proper pressure is being supplied to the system, power will be supplied to the master relay 120, and the power "on" indicator light 122 will be illuminated. As can be seen, a normally closed power "off" pushbutton 152 is supplied to cut power to the system when it is desired by the operator to turn the system off.

The operator will then select the auto or manual mode of operation of the system by use of the auto/manual switch 154. If the operator should select the manual mode of operation, such as for setup purposes the manual relay 155 will be energized, as well as the cycle start relay (CR3) 156. This will, in turn, allow the operator to activate the extend slide pushbutton 157, power will be supplied to the "A" side of the two-way air valve 52, the slide will extend, and the manual light 137 will also illuminate.

When the slide is fully extended, the screw driven proximity switch 59 will be activated, activating the screw driver relay 159, and illuminating screw driven indicator light 142.

If the operator has now, for example, finished his set up and desires to return the slide to its retracted position, the operator will depress the retract slide pushbutton 168 which will supply air pressure to the "B" side of two-way air valve 52 causing the slide unit 81 to retract until the slide return proximity switch 58 supplies a signal to illuminate the slide return indicator light 173.

If the operator had selected the automatic mode of operation on the toggle switch, automatic relay 158 would be energized, illuminating the "auto" indicator light 171. The operator would also push the cycle start pushbutton 160, illuminating the cycle start indicator light 170. If the slide return proximity switch 58 were closed, and the screw present limit switch 110 were activated, illuminating the "screw in head" indicator light 172, this would allow the cycle start relay 156 to be activated, and the power would be supplied by the cycle start relay 156 to the "A" side of the two-way air valve 52, and the slide would extend and keep extending until the screw driven proximity switch 59 was energized, at which time the screw driven relay 159 would be activated.

Once the screw driven relay was activated, the screw driven indicator light 142 would come on showing this to the operator. When the screw is completely driven, the air supplied to the cylinders 82 and 83 is reversed by the cycle start relay 156 supplying power to the "B" side of the two-way air valve 52 causing the cylinders 82 and 83 to retract until the slide return proximity switch 52 is contacted and the slide return indicator light 173 is illuminated.

A ladder diagram showing an actual embodiment of such a system is shown in FIG. 12, and is easily understandable to one skilled in the art.

Referring now to FIG. 13, a block diagram showing the system using a programmable controller is illustrated. The operation of our system using a programmable controller may be identical to the operation of the system using relay logic, except that the programmable controller 125 replaces the numerous relays just described.

As before, the operator will determine that none of the emergency stop pushbuttons 150 has been depressed. After this is determined the operator will depress the power "on" switch 151 supplying power to the master relay 120. When power is supplied to the master relay 120, the power "on" indicator light 122 will be illuminated, power will be supplied to the process controller 125, as well as to the auto/manual selector switch 154, the air pressure switch 153, the screw low limit detector 180, the extend slide pushbutton 157, the retract slide pushbutton 168, the cycle start pushbutton 160, the screw in head limit switch 110, the screw driven proximity switch 59, the slide retracted proximity switch 58, and the feed screw pushbutton 181.

The operator must next determine whether he will operate the cycle manually, such as for testing, or completely automatically. If he desires to operate it manually, he will auto/manual selector switch 154 in the manual mode and, provided that the air pressure switch 153 is in a position to indicate that air at proper pressure is being supplied to the system, the proper signal will be supplied to the process controller to let the cycle continue. Whether in the manual or automatic mode, for the cycle to continue, the process controller must receive a signal from the screw low limit detector 180 to ascertain that there are sufficient screws in the feed hopper to supply screws to the system.

A signal must also be received from the screw in head limit switch 110 indicating that there is a screw in position to be driven. If there is, the screw in head indicator light 172 will be illuminated. If there is not a screw present, there is provided a feed screw pushbutton 181 (normally operable in the manual mode only) which will signal the controller 125 to send a signal to the screw feed switch 177 to supply a screw.

After the operator depresses the extend slide pushbutton 157 (also normally operable in the manual mode only for setup) the process controller will illuminate the cycle start indicator light 170, and the slide will extend until the screw driven proximity switch 59 is activated, at which time the cycle complete indicator light 174 will be illuminated. To retract the slide for further operations or setup, etc., the operator will depress the retract slide pushbutton 168 which will signal the process controller to send a signal to the "B" side (SV-1B) of the two-way air valve 52, causing the air supply to the cylinders 82 and 83 to be reversed, and causing the slide to be retracted until the slide retracted proximity switch is activated, sending a suitable signal to the process controller to indicate that the cycle is complete.

If the operator selected the automatic mode on the auto/manual selector switch 154, the same sequence of operations would take place without the operator having to utilize the extend slide pushbutton 157, the retract slide pushbutton 168, or the feed screw pushbutton 181.

The process controller would automatically operate the feed screw switch 177 to supply a screw at the beginning of each cycle, and thus ensure that the screw in head limit switch 110 would signal that a screw was present before the processor would continue the sequence of operations. As before, the screw driven proximity switch 59 and the slide retracted proximity switch 58 would provide the limits of travel for the slide unit 81.

In the automatic mode, however, an additional indicator light comes into operation which is not used in the manual mode. This is the screw driven indicator light 177. Also, an additional signal not generally supplied in the manual mode of operation is the part present signal 175. In the automatic mode of operation this signal must be constantly supplied from other areas of the robotic system so that the processor will be informed as to when to begin operations.

Other indicator lights are also supplied for the convenience of the operator. A manual indicator light 137 is illuminated when the operator has selected the manual mode on the auto/manual selector switch 154. Likewise, the auto indicator light 171 is illuminated by the controller when the auto mode is selected.

A screw supply low indicator light 176 illuminates any time the screw supply falls below the necessary level to operate the processor. Upon seeing this indicator light illuminated, the operator will, of course, add a new supply of screws to the hopper.

Figure 14:
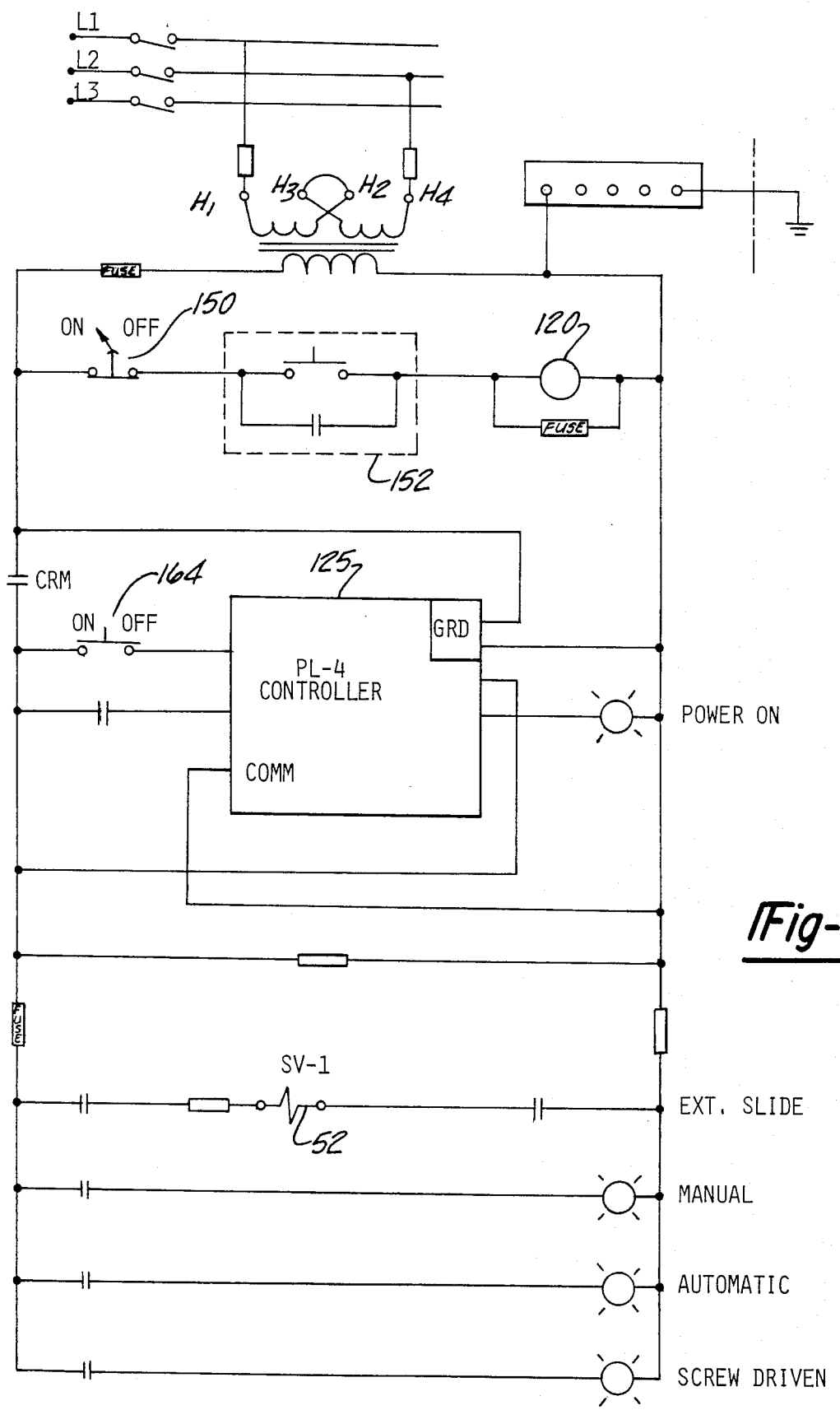
FIG. 14 is a ladder diagram of an embodiment of our automatically operated construction using a programmable controller.

A ladder diagram showing an actual embodiment of a system using a programmable controller is shown in FIG. 14, and is easily understandable by one skilled in the art; therefore, additional description thereof is not necessary herein.

Figure 15:
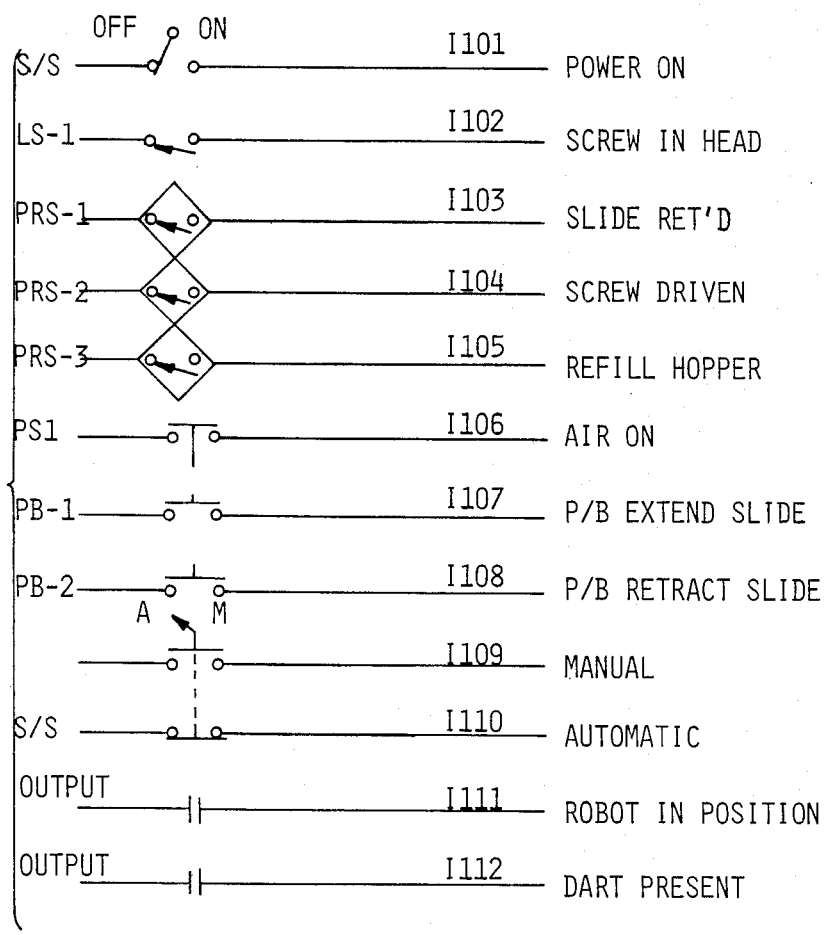
FIG. 15 is a diagrammatic view showing the inputs to the programmable controller illustrated in FIG. 14.
Figure 16:
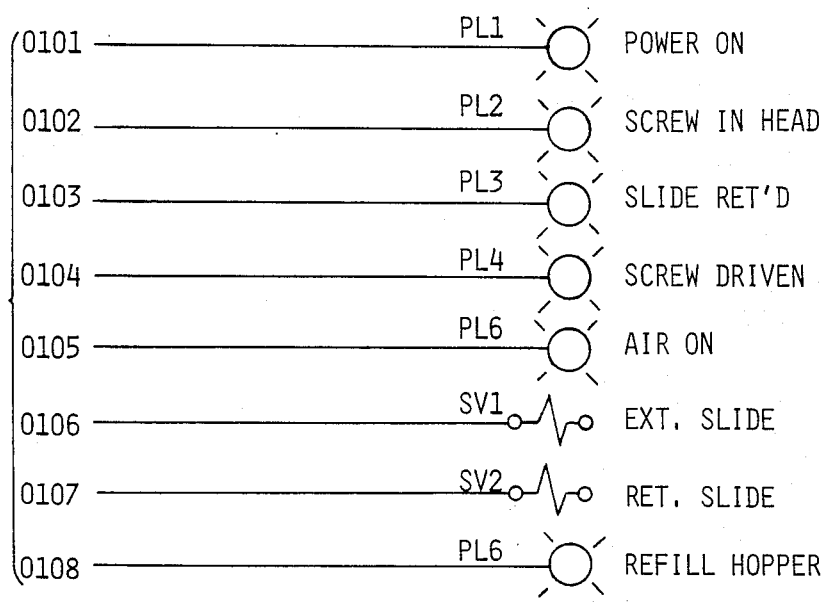
FIG. 16 is a diagrammatic view showing the outputs of the programmable controller illustrated in FIG. 14.

The inputs and outputs to an actual embodiment of our system utilizing the programmable controller are shown in FIGS. 15 and 16, while the actual computer program used in a programmable controller to control the inputs and outputs can be seen by referring to FIG. 17. Taking these figures, and the memory addresses shown, in combination with a description of our system as described in connection with FIGS. 2, 12 and 13, it is well within the ability of one skilled in the art to construct our automatic screw driver system using a programmable controller and operate the same.

Thus, by providing a novel screw sensing means in combination with a unique advance and retract means in an automatic screwdriver system, the problems of screw detection and driver movement present in the prior art have been solved to provide an automatic screw driving system useable for robotic applications.

We claim:
1. An automatic screwdriver system including, in combination:
 (a) a fastener driving means including a hollow head unit;
 (b) means to detect the presence of a fastener in said hollow head unit, said means to detect including
  (i) a pivoting member mounted to said hollow head unit and normally biased downwardly in the absence of a fastener, but constructed so as to be biased upwardly when a fastener is in position to be driven, the forward portion of said pivoting member being complimentary in shape to a fastener to be driven;
  (ii) spring means to aid in biasing said pivoting member downwardly; and

(iii) a switch means mounted to said hollow head unit and operated by said pivoting member to indicate the presence of a fastener in said hollow head unit;

(c) means to advance and retract said fastener driving means;

(d) means to control connected to said fastener driving means, said means to detect, and said advance and retract means; and (e) means to supply fasteners to said fastener driving means.

2. The device defined in claim 1, wherein said switch means include:

(a) an insulating block mounted to said hollow head unit;

(b) an upper contact mounted in said insulating block;

(c) a lower contact mounted in said insulating block in a normally open relationship with said lower contact in a position to be closed by said pivoting member;

(d) a conductor connected to said upper contact and to said means to control; and (e) a conductor connected to said lower contact and said means to control.

3. The device defined in claim 2, wherein said means to control includes:

(a) a two-way solenoid operated air valve connected to said first and said second air cylinder by suitable conduit and having an "A" side and a "B" side.

4. The device defined in claim 3, wherein said means to control further includes:

(a) a master relay connected to a source of power.

5. The device defined in claim 4, and including:

(a) an auto/manual switch connected to said master relay.

6. The device defined in claim 5, and further including the following devices connected in series and interposed between said master relay and said power supply:

(a) a fuse;

(b) an emergency stop pushbutton;

(c) a power "off" pushbutton;

(d) a power "on" pushbutton; and (e) an air pressure switch.

7. The device defined in claim 5, and further including:

(a) a power on indicator light connected to common, and to said master relay immediately after said air pressure switch.

8. The device defined in claim 5, and further including:

(a) a manual relay connected to said auto/manual switch; and (b) an extend slide pushbutton connected to said manual relay.

9. The device defined in claim 8, and further including:

(a) a manual indicator light connected to said manual relay and to common; and (b) a retract slide pushbutton connected to said extend slide pushbutton and to said two-way air valve.

10. The device defined in claim 9, and further including, in combination:

(a) an auto relay connected to said auto/manual switch;

(b) a cycle start pushbutton connected to said auto relay;

(c) a slide returned proximity switch connected to said cycle start pushbutton;

(d) a screw in head limit switch connected to said slide extend pushbutton;

(e) a fuse connected to said screw in head limit switch; and (f) a cycle start relay connected to said fuse, said extend slide pushbutton, and said air valve.

11. The device defined in claim 10, and further including:

(a) a screw feed switch connected to said cycle start relay;

(b) a screw supply low indicator light connected to said screw feed switch;

(c) an auto indicator light connected to common and to said auto relay;

(d) a screw in head indicator light connected to said screw in head limit switch;

(e) a cycle start indicator light connected to common and to said cycle start relay; and (f) a slide returned indicator light connected to said slide returned proximity switch.

12. The device defined in claim 11, and further including:

(a) a screw driven relay connected to said cycle start relay;

(b) a screw driven proximity switch connected to said screw driven relay and to said master relay; and (c) a screw driven indicator light connected to said screw driven relay.

13. The device defined in claim 2, wherein said means to control further include:

(a) a master relay connected to a source of power; and (b) a programmable controller connected to said master relay.

14. The device defined in claim 13, and including the following interposed in series between said master relay and said power supply:

(a) a fuse;

(b) an emergency stop button;

(c) a power "on" pushbutton; and (d) a power "off" pushbutton.

15. The device defined in claim 14, and further including:

(a) a power on indicator light connected to said master relay.

16. The device defined in claim 13, and further including:

(a) an auto/manual selector switch connected to said master relay and to said programmable controller.

17. The device defined in claim 16, and including:

(a) an air pressure switch connected to said master relay and to said programmable controller.

18. The device defined in claim 17, and including:

(a) a screw low limit detector connected to said master relay and to said programmable controller.

19. The device defined in claim 18, and including:

(a) an extend slide pushbutton connected to said master relay and to said programmable controller.

20. The device defined in claim 19, and including:

(a) a retract slide pushbutton connected to said master relay and to said programmable controller.

21. The device defined in claim 20, and including:

(a) a cycle start pushbutton connected to said master relay and to said programmable controller.

22. The device defined in claim 21, and including:

(a) a screw in head limit switch connected to said master relay and to said programmable controller.

23. The device defined in claim 22, and including:
(a) a screw driven proximity switch connected to said master relay and to said programmable controller.

24. The device defined in claim 23, and including:
(a) a slide retracted proximity switch connected to said master relay and to said programmable controller.

25. The device defined in claim 24, and including:
(a) a feed screw pushbutton connected to said master relay and to said programmable controller.

26. The device defined in claim 25, and including a two-way air valve connected to said process controller.

27. The device defined in claim 26, and including a screw feed switch connected to said programmable controller.

28. The device defined in claim 27, and including:
(a) an auto indicator light connected to said programmable controller;
(b) a manual indicator light connected to said programmable controller;
(c) a screw supply low indicator light connected to said programmable controller;
(d) a screw in head indicator light connected to said programmable controller;
(e) a cycle start indicator light connected to said programmable controller;
(f) a slide retracted indicator light connected to said programmable controller;
(g) a cycle complete indicator light connected to said programmable controller; and
(h) a screw driven indicator light connected to said programmable controller.

* * * * *